(12) United States Patent
Yoshioka et al.

(10) Patent No.: US 6,337,641 B1
(45) Date of Patent: Jan. 8, 2002

(54) EMERGENCY REPORTING SYSTEM AND TERMINAL APPARATUS THEREIN

(75) Inventors: Kenji Yoshioka, Yokohama; Yasutoshi Nakama, Ikoma; Masashi Yamamoto, Sagamihara, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/488,525

(22) Filed: Jan. 21, 2000

(30) Foreign Application Priority Data

Jan. 29, 1999 (JP) .......................... 11-022337
Feb. 3, 1999 (JP) .......................... 11-026655

(51) Int. Cl.[7] .............................................. G08G 1/123
(52) U.S. Cl. ...................................... 340/989; 340/988
(58) Field of Search ................................ 340/989, 988, 340/426, 457; 455/404, 456; 701/213, 215, 222

(56) References Cited

U.S. PATENT DOCUMENTS

| 4,369,426 A | * | 1/1983 | Merkel ......................... 340/32 |
| 5,523,762 A | * | 6/1996 | Streetman .................... 340/989 |
| 5,572,204 A | * | 11/1996 | Timm et al. .................. 340/988 |
| 5,914,675 A | * | 6/1999 | Tognazzini .................. 340/989 |
| 5,918,180 A | * | 6/1999 | Dimino ....................... 340/988 |
| 5,963,129 A | * | 10/1999 | Warner ........................ 340/988 |

FOREIGN PATENT DOCUMENTS

| JP | 62-193347 | 12/1987 |
| JP | 5-5626 | 1/1993 |
| JP | 5-20578 | 1/1993 |
| JP | 8-130589 | 5/1996 |
| JP | 8-239011 | 9/1996 |
| JP | 10-210185 | 8/1998 |

* cited by examiner

Primary Examiner—John Tweel, Jr.
(74) Attorney, Agent, or Firm—Louis Woo

(57) ABSTRACT

An emergency reporting apparatus for a vehicle includes a communication device. In cases where an emergency occurs in the vehicle, the communication device is used to report the emergency to an emergency report receiving center. A user is informed of an operating condition of the communication device when the communication device is used to report the emergency. The communication device may include a radio communication device.

11 Claims, 14 Drawing Sheets

107A INFORMING DEVICE

107B INFORMING DEVICE

EMERGENCY REPORTING SYSTEM AND TERMINAL APPARATUS THEREIN

BACKGROUND OF THE INVENTION

1. Field of the Invention

This invention relates to an emergency reporting network system for vehicles such as automotive vehicles. This invention also relates to a terminal apparatus used in an emergency reporting network system.

2. Description of the Related Art

A known emergency communication apparatus for a vehicle is automatically started when the vehicle causes an accident. The known apparatus can also be started when a trigger button is depressed by vehicle's driver (a user). After the start, the known apparatus calls an emergency report receiving center by radio and hence tries to connect with the center. When the radio connection with the center has been established, the known apparatus implements emergency data communication (or emergency speech communication) with the center. According to the known apparatus, the user is not informed of whether the emergency data communication is being successfully implemented. Thus, the user tends to feel uneasy about operation of the known apparatus immediately after the occurrence of the accident.

Japanese published unexamined patent application 5-20578 discloses a present position emergency informing device mounted on an automobile. The emergency informing device in Japanese application 5-20578 includes a crash sensor, a position detector, and an automobile telephone. When the automobile causes a crash, the crash sensor detects a related impact force. At the same time as the moment of detection of the impact force, the position detector is operated. Subsequently, an emergency section such as police is automatically contacted through the automobile telephone. Then, the accident and the position where the accident occurs are automatically notified to the emergency section.

Japanese published unexamined patent application 5-5626 discloses a navigation system which is designed so that data of emergency numbers fed from a CD-ROM, and its own position data of a vehicle estimated by means of a location device are stored in a FIFO memory. In addition, voices produced in the vehicle are stored in a voice storing device, and personal information about the driver of the vehicle and his fellow passengers is stored in an ID card device. In the navigation system of Japanese application 5-5626, the occurrence of an accident is detected by comparing a change in the signal of an acceleration sensor with a predetermined change in accident-caused impact acceleration. Upon detection of the occurrence of an accident, the information is outputted from the FIFO memory, the voice storing device, and the ID card device externally via a communication unit.

SUMMARY OF THE INVENTION

It is a first object of this invention to provide an improved emergency reporting network system.

It is a second object of this invention to provide an improved terminal apparatus in an emergency reporting network system.

A first aspect of this invention provides an emergency reporting apparatus for a vehicle. The emergency reporting apparatus comprises a communication device; first means for, in cases where an emergency occurs in the vehicle, using the communication device to report the emergency to an emergency report receiving center; and second means for informing a user of an operating condition of the communication device when the communication device is used by the first means.

A second aspect of this invention is based on the first aspect thereof, and provides an emergency reporting apparatus wherein the communication device includes a radio communication device.

A third aspect of this invention is based on the first aspect thereof, and provides an emergency reporting apparatus wherein the operating condition of the communication device includes at least one of a standby state, a calling state, a data communication state, a communication ending state, a retry calling state, a normal communication state, an abnormal communication state, and an out-of-service-area communication-impossible state.

A fourth aspect of this invention is based on the first aspect thereof, and provides an emergency reporting apparatus wherein the second means comprises at least one of 1) means for generating a sound, 2) means for generating a voice, 3) means for providing visual indication, and 4) means for generating light.

A fifth aspect of this invention provides an emergency reporting apparatus for a vehicle. The emergency reporting apparatus comprises a trigger button operable by a user in cases where the vehicle causes an accident; first means for detecting a collision of the vehicle against another object; second means for detecting that the vehicle causes an accident in response to at least one of operation of the trigger button and operation of the first means; third means for updatably detecting a position of the vehicle; a memory; fourth means for storing information of the vehicle position detected by the third means into the memory; a communication device; fifth means for, when the second means detects that the vehicle causes an accident, using the communication device to call an emergency report receiving center and establish connection with the emergency report receiving center; sixth means for, when the connection with the emergency report receiving center has been established by the fifth means, transmitting the information of the vehicle position from the memory to the emergency report receiving center via the communication device; an informing device; and seventh means for, when the connection with the emergency report receiving center has been established by the fifth means, using the informing device to notify the user of an operating condition of the communication device.

A sixth aspect of this invention provides an emergency reporting apparatus for a vehicle. The emergency reporting apparatus comprises a trigger button operable by a user in cases where an emergency occurs; first means for reporting an emergency to an emergency report receiving center in response to operation of the trigger button; and second means for informing a user on at least one of a visual basis and an audio basis that the first means is reporting an emergency.

A seventh aspect of this invention is based on the sixth aspect thereof, and provides an emergency reporting apparatus wherein the second means comprises a visual indicator.

An eighth aspect of this invention is based on the sixth aspect thereof, and provides an emergency reporting apparatus wherein the second means comprises means for generating a beep.

A ninth aspect of this invention is based on the sixth aspect thereof, and provides an emergency reporting apparatus wherein the second means comprises means for generating a synthesized voice.

A tenth aspect of this invention is based on the sixth aspect thereof, and provides an emergency reporting apparatus further comprising a loudspeaker provided in the second means, and third means for using the loudspeaker to execute speech communication while the first means is reporting an emergency.

An eleventh aspect of this invention is based on the sixth aspect thereof, and provides an emergency reporting apparatus further comprising a loudspeaker in an audio apparatus. The second means includes the loudspeaker.

A twelfth aspect of this invention provides an emergency reporting network system comprising emergency report receiving center; a communication network; and emergency reporting apparatuses connectable with the emergency report receiving center via the communication network. Each of the emergency reporting apparatuses comprises the emergency reporting apparatus of one of the sixth to eleventh aspects of this invention.

DESCRIPTION OF THE PREFERRED EMBODIMENTS

First Embodiment

An emergency reporting network system includes emergency reporting apparatuses which are mounted on vehicles (for example, automotive vehicles) respectively. The emergency reporting apparatuses are terminal apparatuses. The emergency reporting network system also includes an emergency report receiving center which operates as a host apparatus. The emergency reporting apparatuses can be connected with the emergency report receiving center via a radio communication network such as a mobile telephone network.

Figure 1:
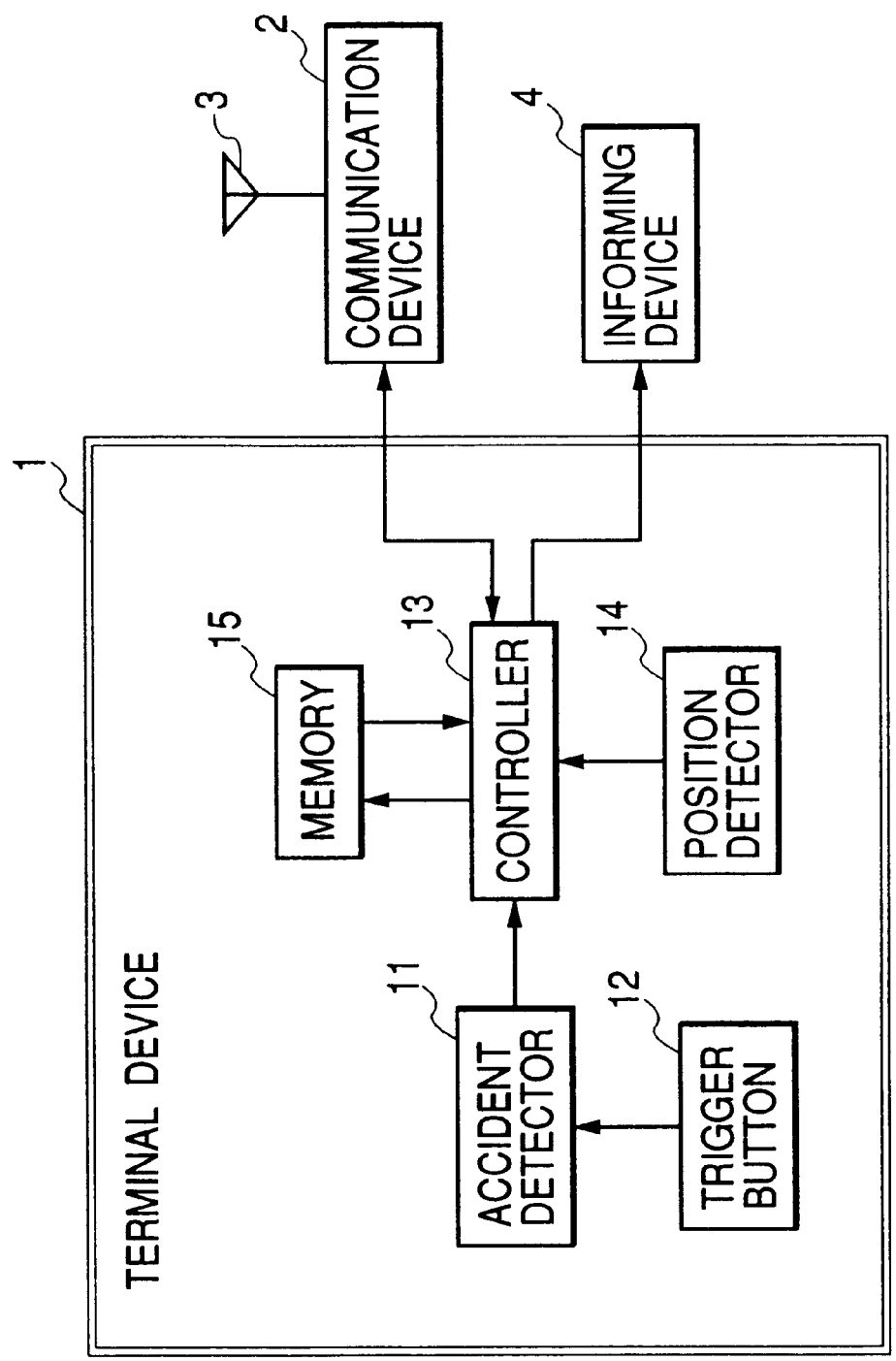
FIG. 1 is a block diagram of an emergency reporting apparatus according to a first embodiment of this invention.

FIG. 1 shows an emergency reporting apparatus (a terminal apparatus) according to a first embodiment of this invention. The emergency reporting apparatus is mounted on a vehicle such as an automotive vehicle.

As shown in FIG. 1, the emergency reporting apparatus includes a terminal device 1, a communication device 2, an antenna 3, and an informing device 4. The terminal device 1 is connected to the communication device 2 and the informing device 4. The communication device 2 is connected to the antenna 3.

The terminal device 1 includes an accident detector 11, a trigger button 12, a controller 13, a position detector 14, and a memory 15. The accident detector 11 is connected to the controller 13. The trigger button 12 is connected to the accident detector 11. The controller 13 is connected to the position detector 14 and the memory 15. The controller 13 is also connected to the communication device 2 and the informing device 4.

The accident detector 11 includes a collision sensor for detecting a collision of the related vehicle with another object, or a crash sensor for detecting a crash of the related vehicle against another object. When the accident detector 11 detects the occurrence of an accident caused by the related vehicle, the device 11 outputs an accident-occurrence indicating signal to the controller 13. Thus, the accident detector 11 informs the controller 13 of the occurrence of an accident caused by the related vehicle.

The trigger button 12 includes a manually-operated button which can be accessed by a user, that is, a driver or an occupant of the related vehicle. When the trigger button 12 is depressed, a trigger signal is transmitted from the trigger button 12 to the controller 13 via the accident detector 11 as an accident-occurrence indicating signal.

The controller 13 includes a microcomputer, a CPU, or a similar device having a combination of an input/output port, a signal processing section, a RAM, and a ROM. The controller 13 operates in accordance with a program stored in the ROM.

The position detector 14 includes a GPS (Global Positioning System) receiver for substantially continuously detecting the current position of the related vehicle. The position detector 14 informs the controller 13 of the detected current position of the related vehicle.

The memory 15 is accessed by the controller 13. A signal representing the current position of the related vehicle is stored into the memory 15 by the controller 13. The vehicle position signal can be read out from the memory 15 by the controller 13.

The communication device 2 includes a radio transceiver, a radio communication device, or a mobile telephone set which can be controlled by the controller 13. The communication device 2 can output and feed a radio signal to the antenna 3. The radio signal is radiated by the antenna 3. The radiated radio signal can propagate to an emergency report receiving center (not shown). The antenna 3 can receive a radio signal from the emergency report receiving center. The received radio signal is fed from the antenna 3 to the communication device 2. In this way, the communication device 2 can communicate with the emergency report receiving center by radio. Furthermore, the communication device 2 can communicate with a base station of a communication network by radio.

The informing device 4 includes a speech synthesis device (a voice synthesis device) which can be controlled by the controller 13. The informing device 4 can notify the user of information on a speech basis.

As previously mentioned, the controller 13 operates in accordance with a program stored in its internal ROM. The program is designed to implement processes indicated later.

The emergency reporting apparatus in FIG. 1 operates as follows. The position detector 14 substantially continuously detects the current position of the related vehicle. The position detector 14 generates data of the detected current vehicle position. The position detector 14 outputs the data of the detected current vehicle position to the controller 13. As previously indicated, the position detector 14 includes a GPS receiver. The position detector 14 may further include a gyro-based direction sensor and a vehicle speed sensor. The controller 13 writes the data of the current vehicle position into the memory 15. The current vehicle position data in the memory 15 are updated in accordance with the lapse of time.

Upon the occurrence of an accident caused by the related vehicle, the accident detector 11 outputs an accident-occurrence indicating signal to the controller 13. In the event of an accident, the trigger button 12 can be depressed by the user. The depression of the trigger button 12 sends an accident-occurrence indicating signal to the controller 13 via the accident detector 11.

The controller 13 feeds a signal of a connection requirement to the communication device 2 in response to the accident-occurrence indicating signal. Thereby, the controller 13 requires the communication device 2 to execute a step of establishing radio connection with the emergency report receiving center. Subsequently, the controller 13 outputs a first status signal to the informing device 4. The first status signal represents that the connection-requirement signal has been fed to the communication device 2. The informing device 4 notifies the user of the contents of the first status signal on a speech basis. Thus, the informing device 4 notifies the user that the connection-requirement signal has been fed to the communication device 2.

The communication device 2 generates a radio connection requirement signal in response to the connection requirement fed from the controller 13. The communication device 2 outputs the radio connection-requirement signal to the antenna 3. The radio connection-requirement signal is radiated by the antenna 3 before propagating to the emergency report receiving center. When the emergency report receiving center is unoccupied and is able to accept radio communication, the emergency report receiving center returns a radio answer signal in response to the radio connection-requirement signal. The radio answer signal is received by the antenna 3. The received radio answer signal is fed from the antenna 3 to the communication device 2. The radio answer signal fed to the communication device 2 represents that radio connection between the communication device 2 and the emergency report receiving center has been established. The communication device 2 informs the controller 13 of the establishment of radio connection between the communication device 2 and the emergency report receiving center.

Immediately after the controller 13 is informed of the establishment of radio connection, the controller 13 reads out the data of the current vehicle position from the memory 15. The controller 13 feeds the data of the current vehicle position to the communication device 2. The controller 13 controls the communication device 2, thereby transmitting the data of the current vehicle position from the communication device 2 to the emergency report receiving center by radio on a data communication basis. Subsequently, the controller 13 outputs a second status signal to the informing device 4. The second status signal represents that the data of the current vehicle position have been fed to the communication device 2. The informing device 4 notifies the user of the contents of the second status signal on a speech basis. Thus, the informing device 4 notifies the user that the data of the current vehicle position have been fed to the communication device 2.

In the case where operation of the communication device 2 is changed from a data communication mode to a speech communication mode, the communication device 2 informs the controller 13 of the operation mode change. In this case, the controller 13 outputs a third status signal to the informing device 4. The third status signal represents that operation of the communication device 2 has been changed from the data communication mode to the speech communication mode. The informing device 4 notifies the user of the contents of the third status signal on a speech basis. Thus, the informing device 4 notifies the user that operation of the communication device 2 has been changed from the data communication mode to the speech communication mode.

In the case where the radio connection between the communication device 2 and the emergency report receiving center is cut off, that is, in the case where the communication device 2 and the emergency report receiving center are disconnected from each other, the communication device 2 informs the controller 13 of the disconnection. In this case, the controller 13 outputs a fourth status signal to the informing device 4. The fourth status signal represents that the radio connection between the communication device 2 and the emergency report receiving center has been cut off. The informing device 4 notifies the user of the contents of the fourth status signal on a speech basis. Thus, the informing device 4 notifies the user that the radio connection between the communication device 2 and the emergency report receiving center has been cut off.

Figure 2:
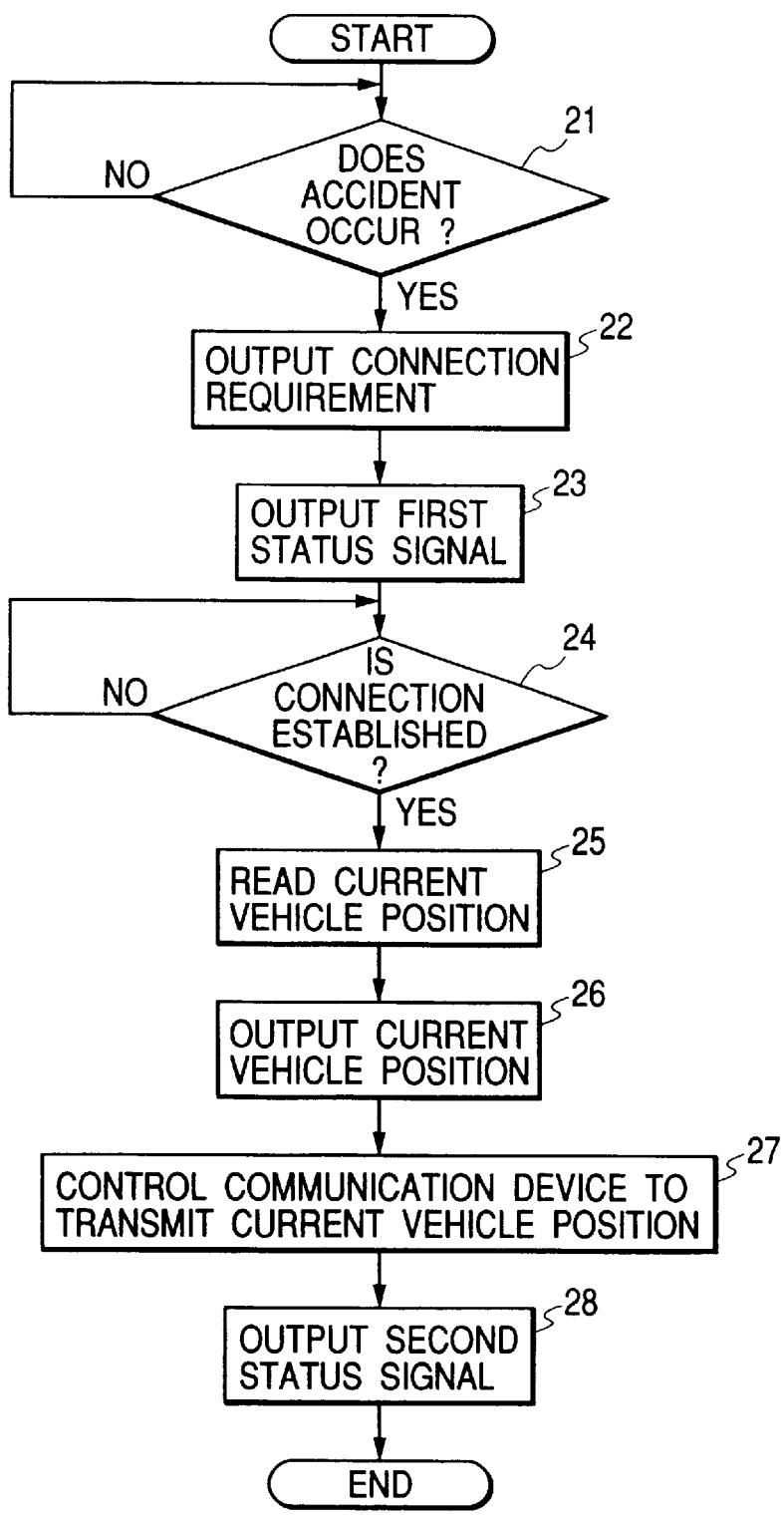
FIG. 2 is a flowchart of a segment of a program for a controller in FIG. 1.

FIG. 2 is a flowchart of a segment of the program for the controller 13. As shown in FIG. 2, a first step 21 of the program segment decides whether or not an accident-occurrence indicating signal is received. When an accident-occurrence indicating signal is not received, the step 21 is repeated. On the other hand, when an accident-occurrence indicating signal is received, the program advances from the step 21 to a step 22.

The step 22 feeds a signal of a connection requirement to the communication device 2. Thereby, the step 22 requires the communication device 2 to execute a step of establishing radio connection with the emergency report receiving center.

A step 23 following the step 22 outputs a first status signal to the informing device 4. After the step 23, the program advances to a step 24.

The first status signal represents that the connection-requirement signal has been fed to the communication device 2. The informing device 4 notifies the user of the contents of the first status signal on a speech basis. Thus, the informing device 4 notifies the user that the connection-requirement signal has been fed to the communication device 2.

As previously mentioned, the communication device 2 generates a radio connection-requirement signal in response to the connection requirement fed from the controller 13. The communication device 2 outputs the radio connection-requirement signal to the antenna 3. The radio connection-requirement signal is radiated by the antenna 3 before propagating to the emergency report receiving center. When the emergency report receiving center is unoccupied and is able to accept radio communication, the emergency report receiving center returns a radio answer signal in response to the radio connection-requirement signal. The radio answer signal is received by the antenna 3. The received radio answer signal is fed from the antenna 3 to the communication device 2. The radio answer signal fed to the communication device 2 represents that radio connection between the communication device 2 and the emergency report receiving center has been established. The communication device 2 informs the controller 13 of the establishment of radio connection between the communication device 2 and the emergency report receiving center.

With reference back to FIG. 2, the step 24 decides whether or not radio connection between the communication device 2 and the emergency report receiving center has been established by referring to information fed from the communication device 2. When radio connection has not yet been established, the step 24 is repeated. On the other hand, when radio connection has been established, the program advances from the step 24 to a step 25.

The step 25 reads out the data of the current vehicle position from the memory 15. A step 26 following the step 25 feeds the data of the current vehicle position to the communication device 2. A step 27 subsequent to the step 26 controls the communication device 2, thereby transmitting the data of the current vehicle position from the communication device 2 to the emergency report receiving center by radio on a data communication basis.

A step 28 following the step 27 outputs a second status signal to the informing device 4. After the step 28, the current execution cycle of the program segment ends.

As previously mentioned, the second status signal represents that the data of the current vehicle position have been fed to the communication device 2. The informing device 4 notifies the user of the contents of the second status signal on a speech basis. Thus, the informing device 4 notifies the user that the data of the current vehicle position have been fed to the communication device 2.

Second Embodiment

Figure 3:
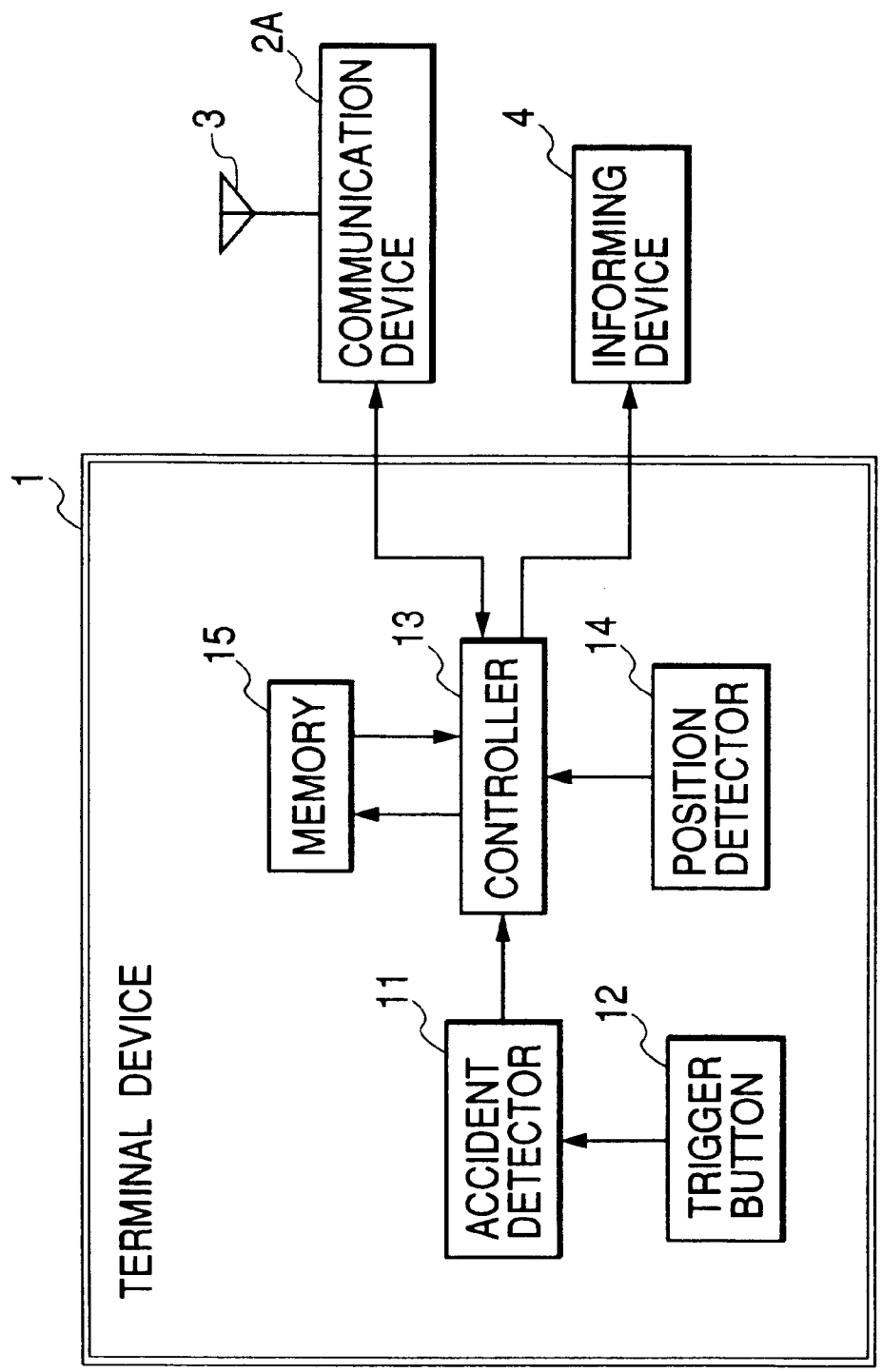
FIG. 3 is a block diagram of an emergency reporting apparatus according to a second embodiment of this invention.

FIG. 3 shows an emergency reporting apparatus (a terminal apparatus) according to a second embodiment of this invention. The emergency reporting apparatus in FIG. 3 is similar to that in FIG. 1 except that a communication device 2A replaces the communication device 2 (see FIG. 1). The communication device 2A includes a portable radio communication terminal device.

Third Embodiment

Figure 4:
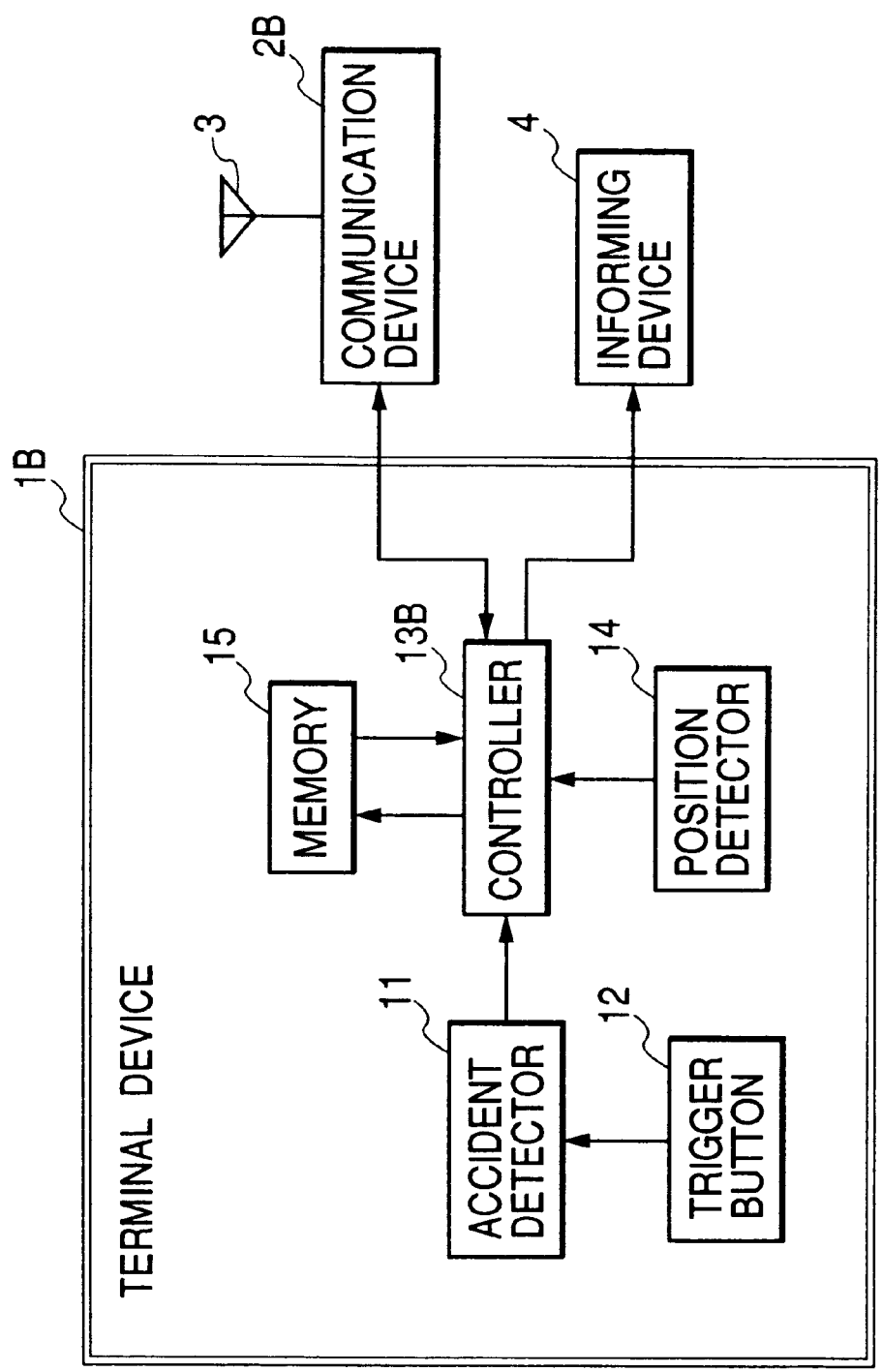
FIG. 4 is a block diagram of an emergency reporting apparatus according to a third embodiment of this invention.

FIG. 4 shows an emergency reporting apparatus (a terminal apparatus) according to a third embodiment of this invention. The emergency reporting apparatus in FIG. 4 is similar to that in FIG. 1 except that a terminal device 1B and a communication device 2B replace the terminal device 1 (see FIG. 1) and the communication device 2 (see FIG. 1) respectively. The terminal device 1B includes a controller 13B instead of the controller 13 (see FIG. 1).

When one of predetermined conditions occurs, the communication device 2B outputs a signal representative thereof to the controller 13B. In this case, the controller 13B feeds a status signal to an informing device 4 in response to the output signal from the communication device 2B. The status signal represents the occurrence of one of the predetermined conditions. The informing device 4 notifies the user of the contents of the status signal on a speech basis. Thus, the informing device 4 notifies the user of the occurrence of one of the predetermined conditions.

Specifically, the predetermined conditions include a first condition 1) in which the communication device 2B falls into a standby state since all radio channels to an emergency report receiving center are occupied, a second condition 2) in which the emergency report receiving center is being called to establish radio connection therewith, a third condition 3) in which radio connection with the emergency report receiving center is established and then a radio channel thereto is in use on a speech communication basis, a fourth condition 4) in which radio connection with the emergency report receiving center is established and then a radio channel thereto is in use on a data communication basis, a fifth condition 5) in which a radio channel to the emergency report receiving center is cut off as a result of termination of communication between the communication device 2B and the emergency report receiving center, a sixth condition 6) in which the communication device 2B retries to establish radio connection with the emergency report receiving center after a first try fails or radio connection is abnormally cut off, a seventh condition 7) which occurs when communication between the communication device 2B and the emergency report receiving center has normally ended, and 8) an eighth condition in which communication with the emergency report receiving center becomes impossible since the communication device 2B moves out of the radio communication service area around the emergency report receiving center when the communication device 2B tries to connect with the emergency report receiving center or has connected therewith.

In the case where one of the previously-mentioned conditions 1)–8) occurs, the communication device 2B outputs a related signal to the controller 13B. Specifically, the output signal from the communication device 2B indicates one of a retry calling state, a normal communication state, an abnormal communication state, and an out-of-service-area communication-impossible state. In this case, the controller 13B supplies the informing device 4 with a status signal corresponding to the output signal from the communication device 2B. The status signal represents, for example, that the communication device 2B is in the standby state. The informing device 4 notifies the user of the contents of the status signal on a speech basis. The informing device 4 notifies the user, for example, that the communication device 2B is in the standby state.

Fourth Embodiment

Figure 5:
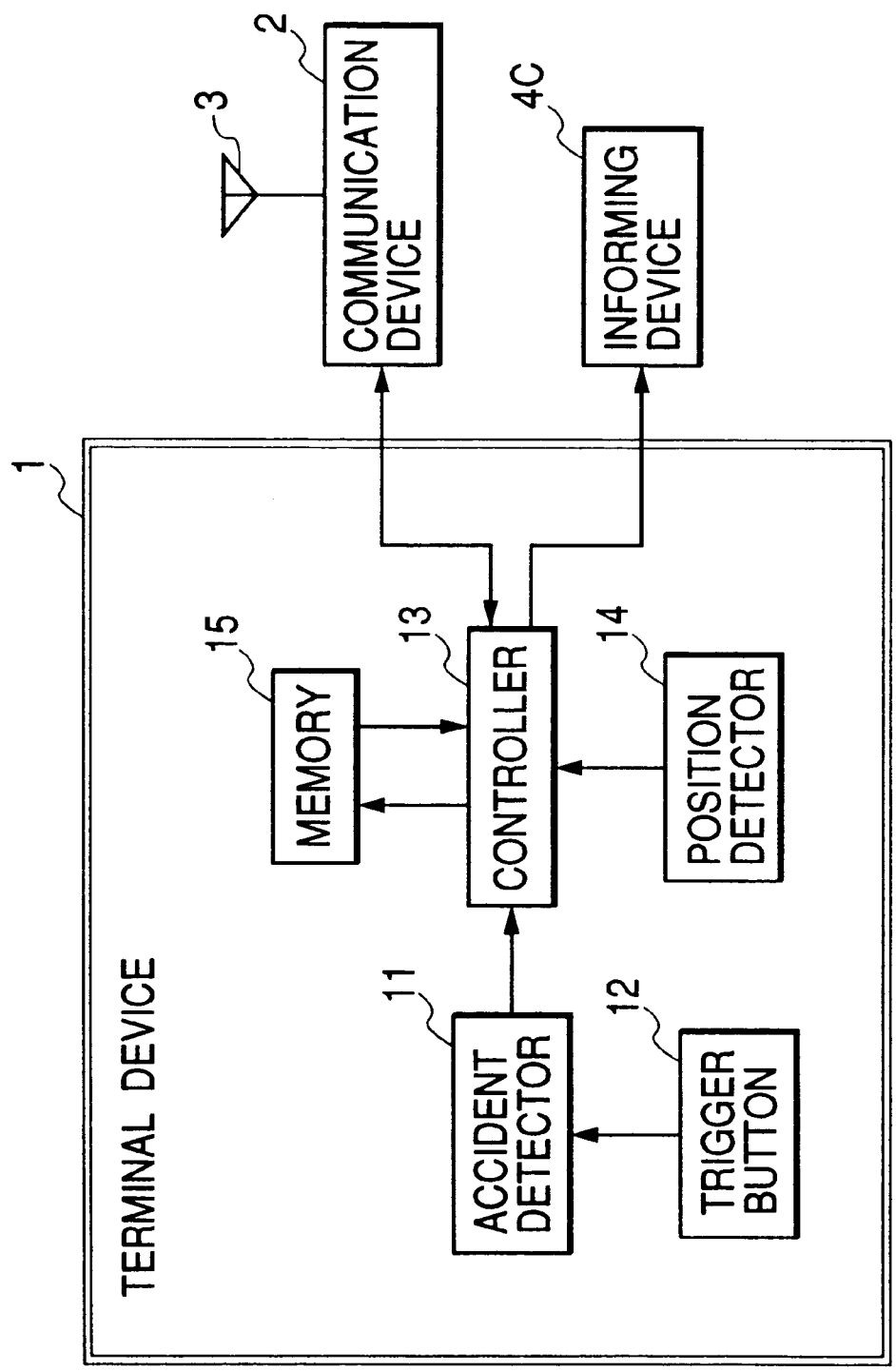
FIG. 5 is a block diagram of an emergency reporting apparatus according to a fourth embodiment of this invention.

FIG. 5 shows an emergency reporting apparatus (a terminal apparatus) according to a fourth embodiment of this invention. The emergency reporting apparatus in FIG. 5 is similar to that in FIG. 1 except that an informing device 4C replaces the informing device 4 (see FIG. 1). The informing device 4C includes a beep generator. The informing device 4C generates a beep in response to a status signal fed from a controller 13. The generated beep has one of prescribed tones which is selected in accordance with the contents of the status signal. Alternatively, the number of times of generation of beep or the volume of beep may depend on the contents of the status signal.

Fifth Embodiment

Figure 6:
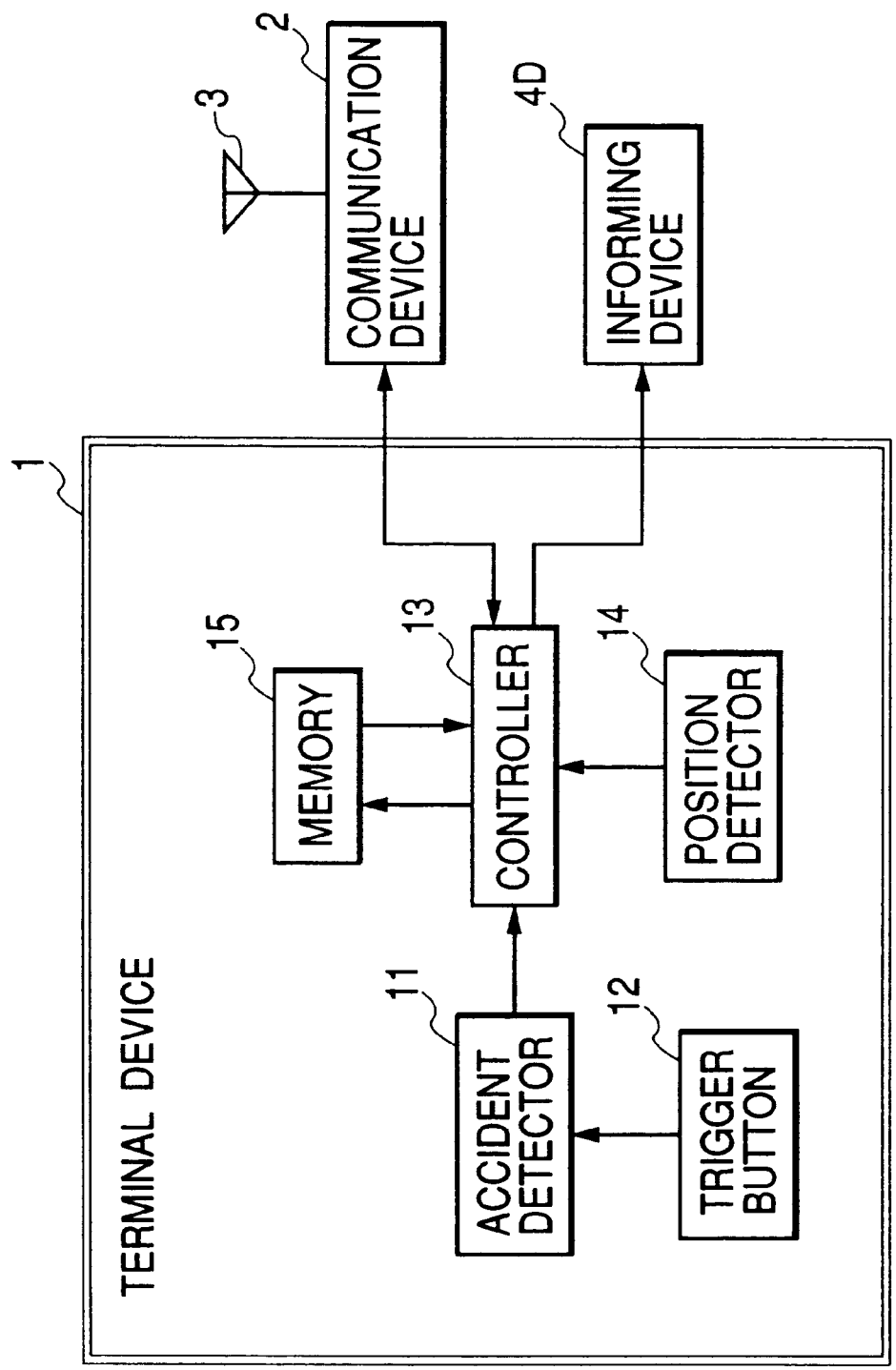
FIG. 6 is a block diagram of an emergency reporting apparatus according to a fifth embodiment of this invention.

FIG. 6 shows an emergency reporting apparatus (a terminal apparatus) according to a fifth embodiment of this invention. The emergency reporting apparatus in FIG. 6 is similar to that in FIG. 1 except that an informing device 4D replaces the informing device 4 (see FIG. 1). The informing device 4D includes a speech synthesis device or a voice synthesis device. The informing device 4D generates one of prescribed verbal messages in response to a status signal fed from a controller 13. The generated verbal message corresponds to the contents of the status signal.

Sixth Embodiment

Figure 7:
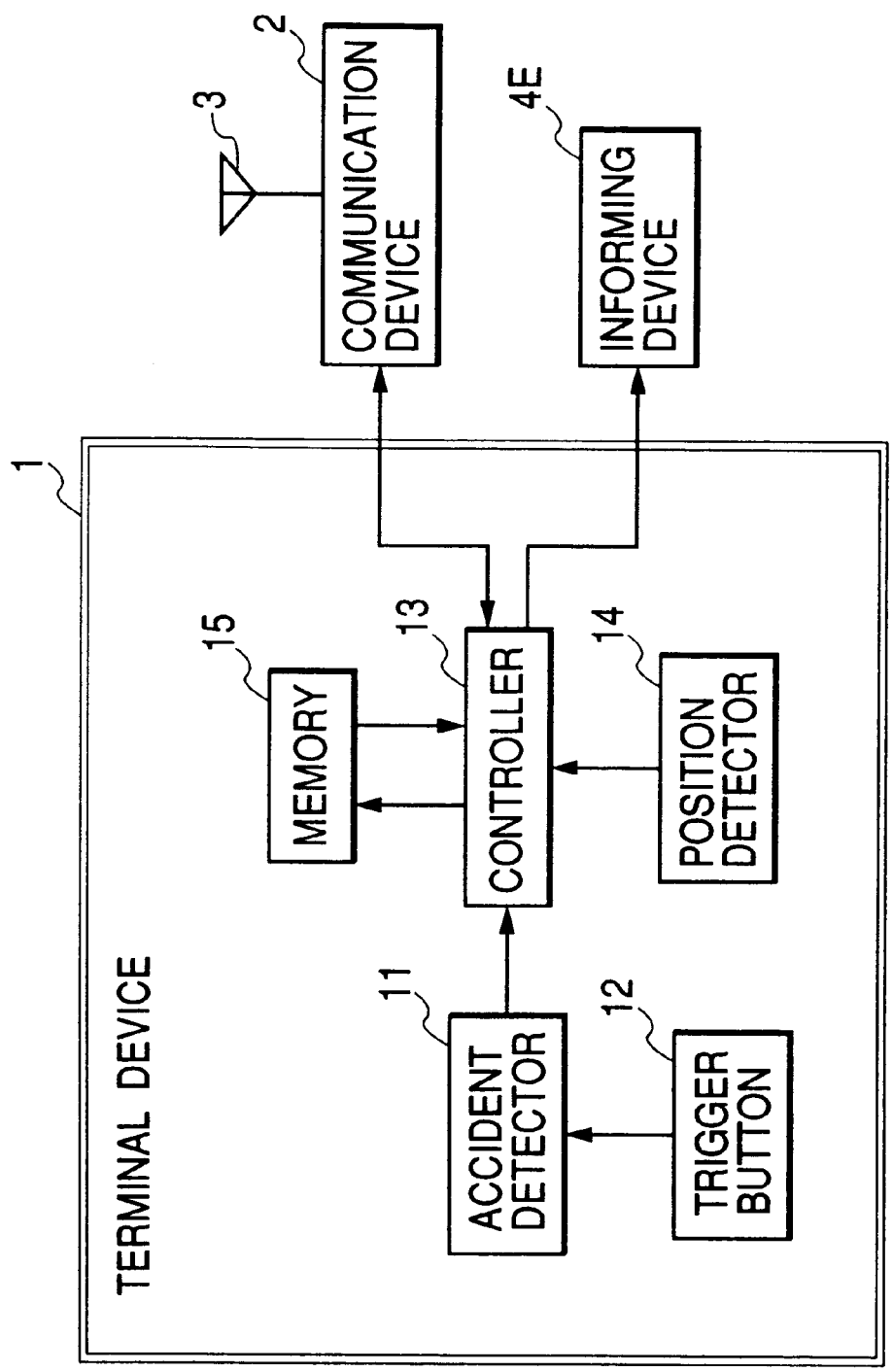
FIG. 7 is a block diagram of an emergency reporting apparatus according to a sixth embodiment of this invention.

FIG. 7 shows an emergency reporting apparatus (a terminal apparatus) according to a sixth embodiment of this invention. The emergency reporting apparatus in FIG. 7 is similar to that in FIG. 1 except that an informing device 4E replaces the informing device 4 (see FIG. 1). The informing device 4E includes an LCD (liquid crystal display). The informing device 4E indicates one of prescribed visual messages or one of prescribed symbol marks in response to a status signal fed from the controller 13. The indicated visual message or the indicated symbol mark corresponds to the contents of the status signal.

Seventh Embodiment

Figure 8:
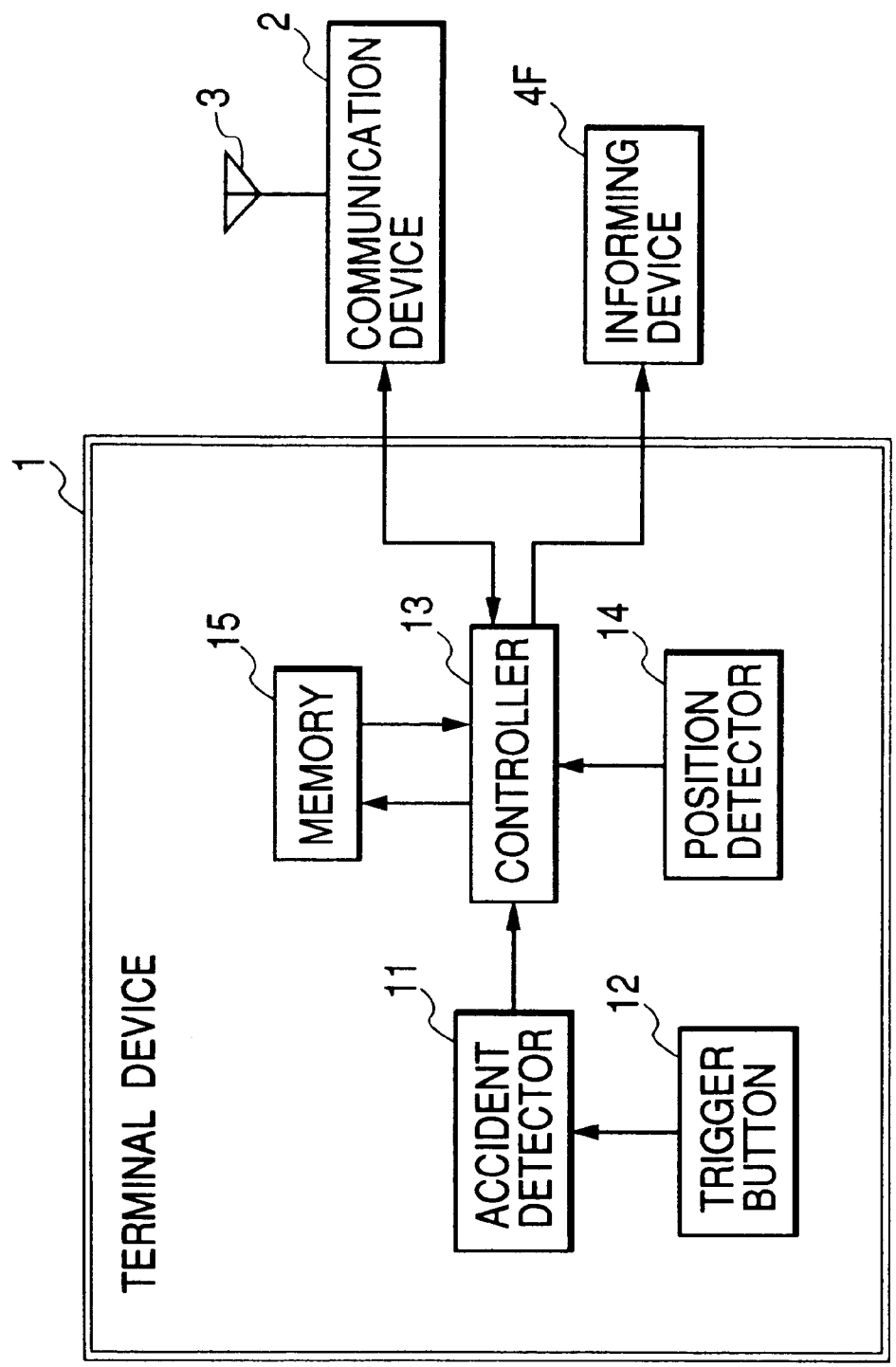
FIG. 8 is a block diagram of an emergency reporting apparatus according to a seventh embodiment of this invention.

FIG. 8 shows an emergency reporting apparatus (a terminal apparatus) according to a seventh embodiment of this invention. The emergency reporting apparatus in FIG. 8 is similar to that in FIG. 1 except that an informing device 4F replaces the informing device 4 (see FIG. 1). The informing device 4F includes an indicator or an illumination device. The informing device 4F generates a light signal in response to a status signal fed from the controller 13. The light signal has one of prescribed colors, one of prescribed on/off patterns, one of prescribed numbers of on/off times, or one of prescribed lighting positions which is selected in accordance with the contents of the status signal.

Eighth Embodiment

An emergency reporting network system includes emergency reporting apparatuses which are mounted on vehicles (for example, automotive vehicles) respectively. The emergency reporting apparatuses are terminal apparatuses. The emergency reporting network system also includes a police station or an emergency report receiving center which operates as a host apparatus. The emergency reporting apparatuses can be connected with the police station or the emergency report receiving center via a mobile telephone network.

Figure 9:
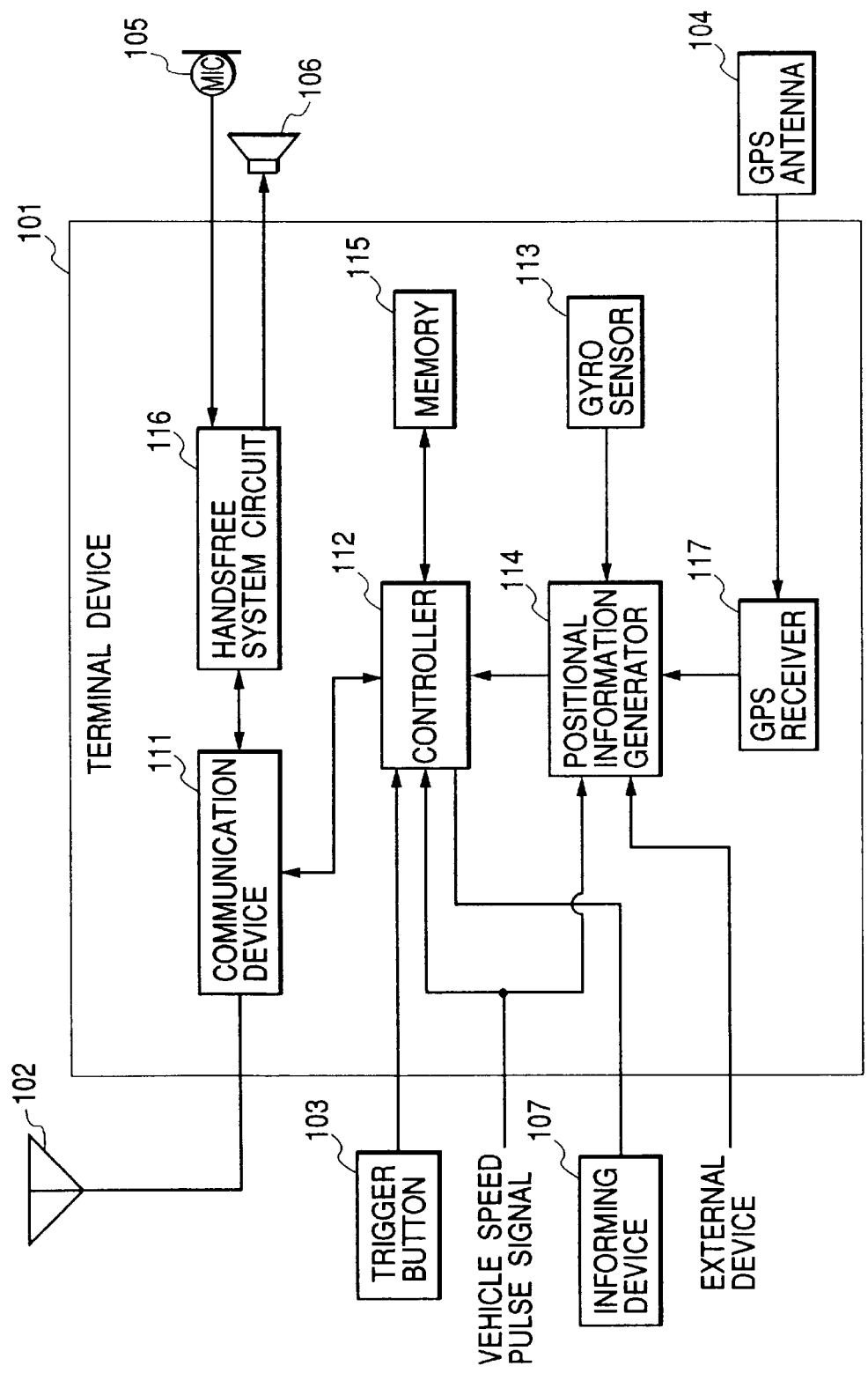
FIG. 9 is a block diagram of an emergency reporting apparatus according to an eighth embodiment of this invention.

FIG. 9 shows an emergency reporting apparatus (a terminal apparatus) according to an eighth embodiment of this invention. The emergency reporting apparatus is mounted on a vehicle such as an automotive vehicle.

As shown in FIG. 9, the emergency reporting apparatus includes a terminal device 101, a communication antenna 102, a trigger button 103, a GPS (Global Positioning System) antenna 104, a microphone 105, a loudspeaker 106, and an informing device 107. The terminal device 101 is connected to the communication antenna 102, the trigger button 103, the GPS antenna 104, the microphone 105, the loudspeaker 106, and the informing device 107.

The terminal device 101 includes a communication device 111, a controller 112, a gyro sensor 113, a positional information generator 114, a memory 115, a handsfree system circuit 116, and a GPS receiver 117. The communication device 111 is connected to the communication antenna 102, the controller 112, and the handsfree system circuit 116. The controller 112 is connected to the trigger button 103, the informing device 107, the positional information generator 114, and the memory 115. The controller 112 receives a pulse signal representative of the speed of the related vehicle from a vehicle speed sensor (not shown). The gyro sensor 113 is connected to the positional information generator 114. The GPS receiver 117 is connected to the GPS antenna 104 and the positional information generator 114. The positional information generator 114 is connected to an external device (not shown) including a navigation device. The positional information generator 114 receives the vehicle speed signal from the vehicle speed sensor (not shown). The handsfree system circuit 116 is connected to the microphone 105 and the loudspeaker 106.

The trigger button 103 includes a manually-operated button which can be accessed by a user, that is, a driver or an occupant of the related vehicle. When the trigger button 103 is depressed, a trigger signal is transmitted from the trigger button 103 to the controller 112 as an emergency-occurrence indicating signal.

The GPS antenna 104 can receive GPS signals from GPS satellites. The GPS antenna 104 feeds the received GPS signals to the GPS receiver 117.

The communication device 111 includes a telephone set such as a mobile telephone set having a radio communication device which can be controlled by the controller 112. The communication device 111 can output and feed a radio signal to the communication antenna 102. The radio signal is radiated by the communication antenna 102. The radiated radio signal can propagate to a base station of a related radio telephone network. The communication antenna 102 can receive a radio signal from the base station. The received radio signal is fed from the communication antenna 102 to the communication device 111. In this way, the communication device 111 can communicate with the base station by radio.

The communication device 111 can receive a call requirement signal and a destination-telephone-number signal from the controller 112. Upon the reception of the call requirement signal, the communication device 111 generates a radio signal to call the communication opposite party designated by the destination telephone number. The radio call signal contains a dial signal. The radio call signal is fed from the communication device 111 to the communication antenna 102 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the communication opposite party is established. Then, the communication device 111 changes to a speech communication mode of operation or a data communication mode of operation. In addition, the communication device 111 informs the controller 112 that the connection with the communication opposite party is established.

The communication device 111 can receive, from the controller 112, positional information data representing the position of the related vehicle, the direction of travel of the related vehicle, and the orientation of the related vehicle. During the data communication mode of operation, the communication device 111 transmits the positional information data to the communication opposite party via the base station. The communication opposite party is, for example, a police station or an emergency report receiving center. During the speech communication mode of operation, the communication device 111 allows speech communication between a user (a driver or an occupant of the related vehicle) and an operator of the communication opposite party via the base station.

The controller 112 includes a microcomputer, a CPU, or a similar device having a combination of an input/output port, a signal processing section, a RAM, and a ROM. The controller 112 operates in accordance with a program stored in the ROM.

The gyro sensor 113 generates data representing the direction of travel of the related vehicle and the orientation of the related vehicle. The gyro sensor 113 outputs the generated data to the positional information generator 114. The GPS receiver 117 generates data representative of the position of the related vehicle in response to the GPS signals fed from the GPS antenna 104. The GPS receiver 117 outputs the generated data to the positional information generator 114. The positional information generator 114 receives data representative of the latitude and longitude of the related vehicle from the external device (not shown). The positional information generator 114 receives the vehicle speed signal from the vehicle speed sensor (not shown). The positional information generator 114 produces positional information data in response to the output data from the gyro sensor 113, the output data from the GPS receiver 117, and the output data from the external device, and the vehicle speed signal. The produced positional information data represent the position of the related vehicle, the direction of travel of the related vehicle, and the orientation of the related vehicle. The positional information generator 114 can output the produced positional information data to the controller 112.

The memory 115 stores information representing the telephone numbers of police stations, the telephone numbers of emergency report receiving centers, the registration number of the related vehicle, and the registrant. The memory 115 can be accessed by the controller 112.

The microphone 105 can pick up voice of a user (a driver or an occupant of the related vehicle). The microphone 105 outputs an audio signal representative of the picked-up voice to the handsfree system circuit 116. The handsfree system circuit 116 can output an audio signal representative of operator's voice in the communication opposite party to the loudspeaker 106. The loudspeaker 106 converts the audio signal into corresponding sound which can be heard by the user. The handsfree system circuit 116 can transmit and receive voice information to and from the communication device 111.

The handsfree system circuit 116 cooperates with the microphone 105, the loudspeaker 106, and the communication device 111, thereby allowing handsfree speech communication between a user (a driver or an occupant of the related vehicle) and an operator of the communication opposite party. The handsfree system circuit 116 has an echo cancel function and an anti-howling function.

The informing device 107 can be controlled by the controller 112. The informing device 107 can receive a control signal and an information signal from the controller 112. The informing device 107 notifies the user of the contents of the information signal on a visual basis, an audio basis, or an audio-visual basis.

The emergency reporting apparatus in FIG. 9 operates as follows. The positional information generator 114 periodically receives data representative of the latitude and longitude of the related vehicle from the external device (not shown). The positional information generator 114 receives output data from the gyro sensor 113. The positional information generator 114 receives output data from the GPS receiver 117. The positional information generator 114 receives the vehicle speed signal from the vehicle speed sensor (not shown). The positional information generator 114 produces positional information data in response to at least one of the output data from the gyro sensor 113, the output data from the GPS receiver 117, and the output data from the external device, and the vehicle speed signal. The produced positional information data represent the position of the related vehicle, the direction of travel of the related vehicle, and the orientation of the related vehicle.

In the event of an emergency such as an accident or a sudden illness, the trigger button 103 can be depressed by a user (a driver or an occupant of the related vehicle). The depression of the trigger button 103 sends an emergency-occurrence indicating signal to the controller 112. The controller 112 recognizes from the emergency-occurrence indicating signal that an emergency should be reported. Then, the controller 112 starts a process of reporting an emergency.

During the emergency reporting process, the controller 112 outputs a signal to the informing device 107 which is designed to notify the user that communication to report an emergency is being executed. In response to the output signal from the controller 112, the informing device 107 auditorily, visually, or audio-visually notifies the user that communication to report an emergency is being executed. During the emergency reporting process, the controller 112 outputs a signal to the positional information generator 114 which requires current positional information (information related to the current position of the related vehicle). In response to the output signal from the controller 112, the positional information generator 114 feeds the current positional information to the controller 112.

During the emergency reporting process, the controller 112 reads out information of a destination telephone number from the memory 115. The designation telephone number is equal to the telephone number of a desired communication opposite party (a police station or an emergency report receiving center). The controller 112 feeds the information of the destination telephone number to the communication device 111. The controller 112 requires the communication device 111 to generate a radio signal to call the communication opposite party designated by the destination telephone number. Accordingly, the communication device 111 generates the radio call signal. The radio call signal contains a dial signal. The radio call signal is fed from the communication device 111 to the communication antenna 102 before being radiated thereby. The radio call signal propagates to a base station. The corresponding call signal is transmitted via the base station to the communication opposite party designated by the destination telephone number. Normally, an answer signal responsive to the call signal is transmitted from the communication opposite party to the base station. The corresponding radio answer signal is transmitted from the base station. The communication antenna 102 receives the radio answer signal. The received radio answer signal is fed from the communication antenna 102 to the communication device 111. The communication device 111 recognizes from the radio answer signal that connection with the communication opposite party is established. Then, the communication device 111 changes to the data communication mode of operation. In addition, the communication device 111 informs the controller 112 that the connection with the communication opposite party is established. Thus, the controller 112 decides that the connection with the communication opposite party has been successfully established.

Subsequently, the controller 112 operates to implement data communication. Specifically, the controller 112 feeds the current positional information to the communication device 111. The controller 112 requires the communication device 111 to generate a radio signal of data of the current positional information. Accordingly, the communication device 111 generates the radio data signal. The radio data signal is fed from the communication device 111 to the communication antenna 102 before being radiated thereby. The radio data signal propagates to the base station. The corresponding data signal is transmitted via the base station to the communication opposite party. In this way, the current positional information is transmitted to the communication opposite party (the police station or the emergency report receiving center) on a data communication basis. After the data communication has been completed, the controller 112 operates to implement speech communication.

During the speech communication, an audio signal representative of operator's voice is transmitted from the communication opposite party to the base station. The corresponding radio speech signal is transmitted from the base station. The communication antenna 102 receives the radio speech signal. The received radio speech signal is fed from the communication antenna 102 to the communication device 111. The communication device 111 recovers an audio signal (a received audio signal) from the radio speech signal. The communication device 111 is controlled by the controller 112, outputting the received audio signal to the handsfree system circuit 116. The received audio signal represents operator's voice in the communication opposite party (the police station or the emergency report receiving center). The handsfree system circuit 116 subjects the received audio signal to an echo cancel process and an anti-howling process. The handsfree system circuit 116 outputs the resultant audio signal to the loudspeaker 106. The loudspeaker 106 converts the audio signal into corresponding sound which can be heard by the user (the driver or the occupant of the related vehicle). During the speech communication, the microphone 105 picks up voice of the user. The microphone 105 outputs an audio signal representative of the picked-up voice to the handsfree system circuit 116. The handsfree system circuit 116 subjects the audio signal to the echo cancel process and the anti-howling process. The handsfree system circuit 116 outputs the resultant audio signal (the resultant speech signal) to the communication device 111. The communication device 111 is controlled by the controller 112, generating a corresponding radio speech signal. The radio speech signal is fed from the communication device 111 to the communication antenna 102 before being radiated thereby. The radio speech signal propagates to the base station. The corresponding speech signal is transmitted via the base station to the communication opposite party. Thus, speech communication is implemented between the user (the driver or the occupant of the related vehicle) and the operator of the communication opposite party (the police station or the emergency report receiving center).

Figure 10:
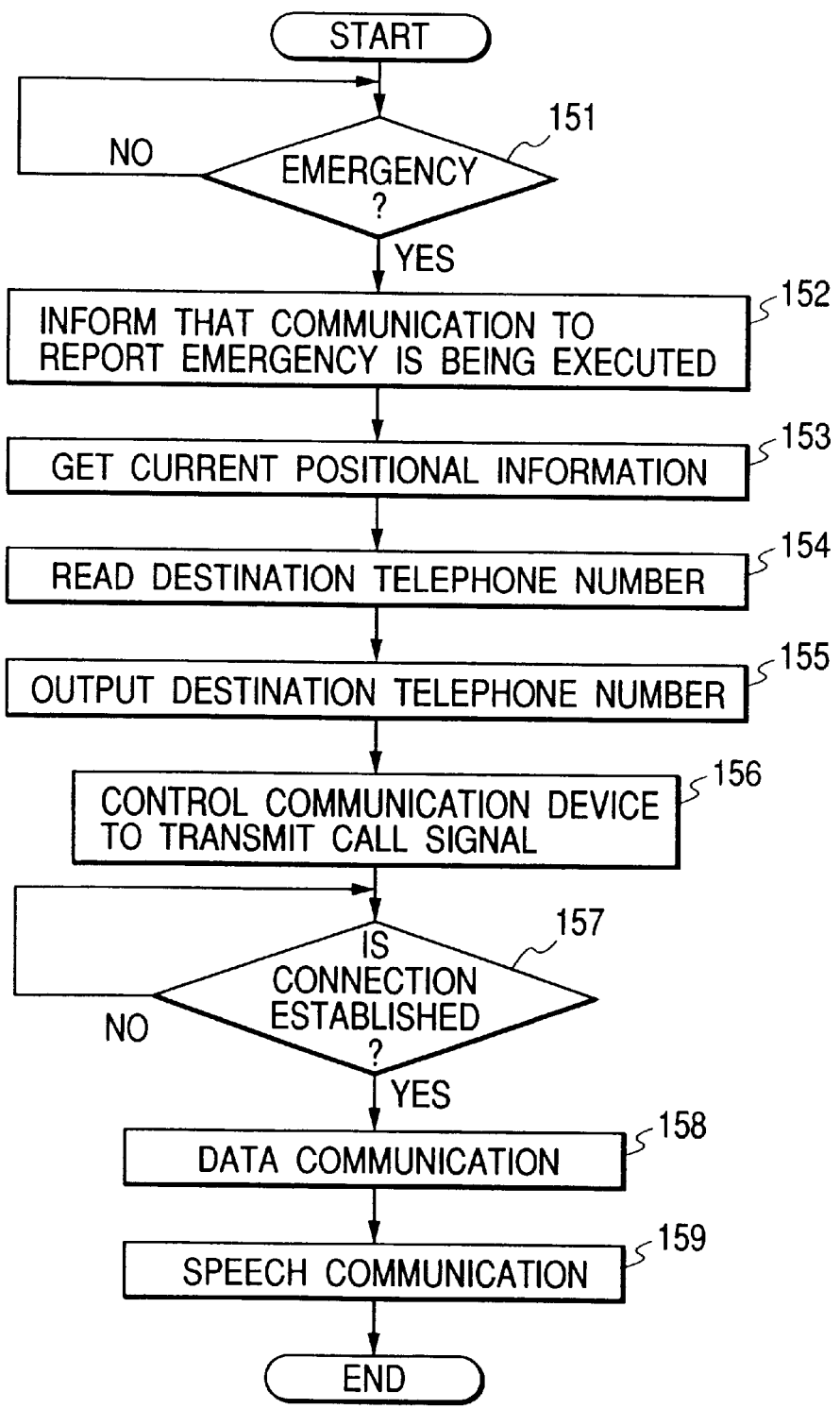
FIG. 10 is a flowchart of a segment of a program for a controller in FIG. 9.

FIG. 10 is a flowchart of a segment of the program for the controller 112. As shown in FIG. 10, a first step 151 of the program segment decides whether or not an emergency-occurrence indicating signal is received. When an emergency-occurrence indicating signal is not received, the step 151 is repeated. On the other hand, when an emergency-occurrence indicating signal is received, the program advances from the step 151 to a step 152.

The step 152 controls the informing device 107 to notify the user that communication to report an emergency is being executed.

A step 153 following the step 152 gets current positional information from the positional information generator 114.

A step 154 subsequent to the step 153 reads out information of a destination telephone number from the memory 115. The designation telephone number is equal to the telephone number of a desired communication opposite party (a police station or an emergency report receiving center).

A step 155 following the step 154 informs the communication device 111 of the destination telephone number.

A step 156 subsequent to the step 155 controls the communication device 111 to generate a radio signal to call the communication opposite party designated by the destination telephone number. As previously mentioned, the radio call signal is transmitted from the communication device 111 to a base station. Then, the corresponding call signal is transmitted via the base station to the communication opposite party designated by the destination telephone number. After the step 156, the program advances to a step 157.

The step 157 decides whether or not connection with the communication opposite party has been established by referring to information fed from the communication device 111. The connection-related information is generated by the communication device 111 on the basis of an answer signal which is transmitted from the communication opposite party in response to the call signal. When connection with the communication opposite party has not yet been established, the step 157 is repeated. On the other hand, when connection with the communication opposite party has been established, the program advances from the step 157 to a step 158.

The step 158 implements data communication. Specifically, the step 158 feeds the current positional information to the communication device 111. The step 158 controls the communication device 111 to transmit the current positional information to the communication opposite party.

A step 159 following the step 158 controls the communication device 111 to implement speech communication between the user (the driver or the occupant of the related vehicle) and the operator of the communication opposite party (the police station or the emergency report receiving center). After the step 159, the current execution cycle of the program segment ends.

Ninth Embodiment

Figure 11:
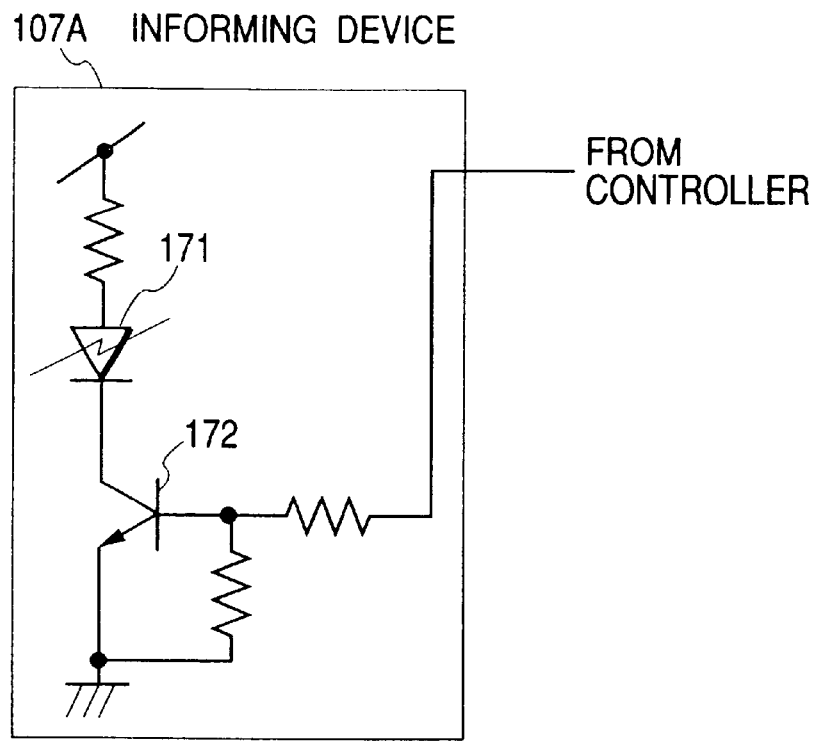
FIG. 11 is a diagram of a portion of an emergency reporting apparatus according to a ninth embodiment of this invention.

FIG. 11 shows a portion of an emergency reporting apparatus (a terminal apparatus) according to a ninth embodiment of this invention. The emergency reporting apparatus in FIG. 11 is similar to that in FIG. 9 except that an informing device 107A replaces the informing device 107 (see FIG. 9).

As shown in FIG. 11, the informing device 107A includes a light emitting diode (LED) 171 and a switching transistor 172. The light emitting diode 171 forms a visual indicator. The light emitting diode 171 and the switching transistor 172 are connected in series. The series combination of the light emitting diode 171 and the switching transistor 172 is connected across a DC power source (not shown). The base of the switching transistor 172 is connected to a controller 112. The switching transistor 172 is controlled by the controller 112, being changed between an on state and an off state. When the switching transistor 172 is in its on state, the light emitting diode 171 is activated. When the switching transistor 172 is in its off state, the light emitting diode 171 is deactivated.

In the case where the informing device 107A is required to notify a user that communication to report an emergency is being executed, the controller 112 controls the switching transistor 172 to activate the light emitting diode 171. In this case, the controller 112 may control the switching transistor 172 to periodically activate and deactivate the light emitting diode 171. Alternatively, the controller 112 may control the switching transistor 172 to change a pattern of periodical activation and deactivation of the light emitting diode 171.

For example, the light emitting diode 171 is placed in or on a trigger button 103 (see FIG. 9). The light emitting diode 171 may be placed in or on a vehicle instrument panel.

Tenth Embodiment

Figure 12:
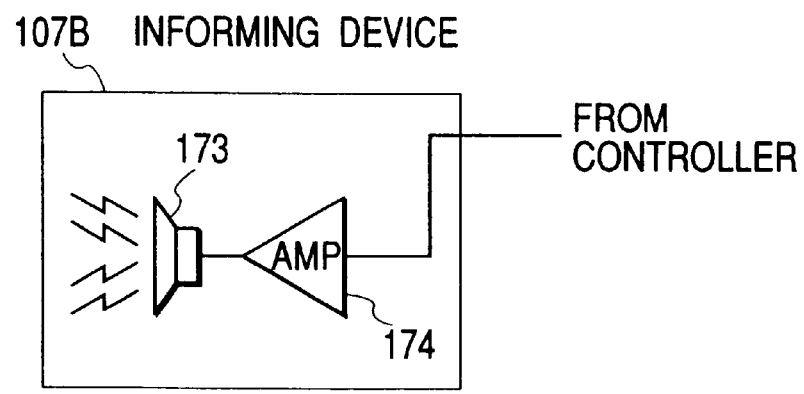
FIG. 12 is a diagram of a portion of an emergency reporting apparatus according to a tenth embodiment of this invention.

FIG. 12 shows a portion of an emergency reporting apparatus (a terminal apparatus) according to a tenth embodiment of this invention. The emergency reporting apparatus in FIG. 12 is similar to that in FIG. 9 except that an informing device 107B replaces the informing device 107 (see FIG. 9).

As shown in FIG. 12, the informing device 107B includes a loudspeaker 173 and an amplifier 174. The loudspeaker 173 is connected to the output terminal of the amplifier 174. The input terminal of the amplifier 174 is connected to a controller 112.

When the informing device 107A is required to notify a user that communication to report an emergency is being executed, the controller 112 outputs a control signal to the amplifier 174. The control signal represents a beep. The device 174 amplifies the control signal, and outputs the amplification-resultant control signal to the loudspeaker 173. The loudspeaker 173 converts the output signal of the amplifier 174 into a corresponding sound, that is, a beep. In this case, the control signal outputted from the controller 112 to the amplifier 174 may be designed to change a pattern of a beep produced by the loudspeaker 173.

It should be noted that the loudspeaker 173 may be replaced by a buzzer.

Eleventh Embodiment

Figure 13:
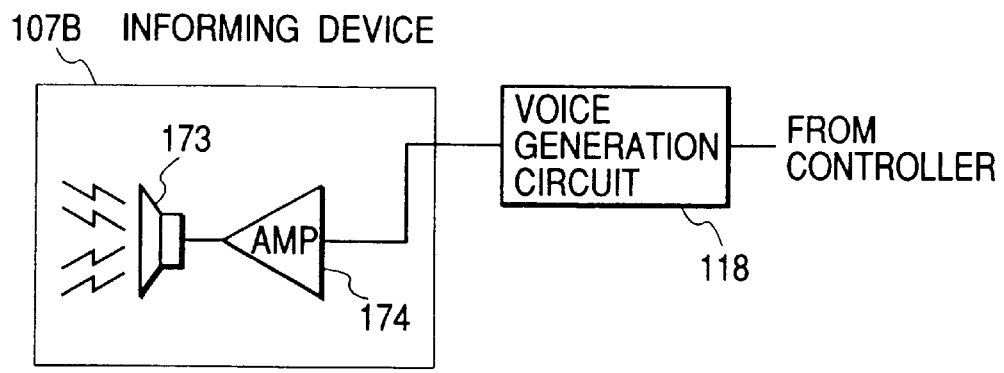
FIG. 13 is a diagram of a portion of an emergency reporting apparatus according to an eleventh embodiment of this invention.

FIG. 13 shows a portion of an emergency reporting apparatus (a terminal apparatus) according to an eleventh embodiment of this invention. The emergency reporting apparatus in FIG. 13 is similar to that in FIG. 12 except that a voice generation circuit (a speech synthesis circuit) 118 is connected between an informing device 107B and a controller 112.

The voice generation circuit 118 includes a digital signal processor (DSP) designed to generate an audio signal representing a predetermined guidance voice message.

When the informing device 107B is required to notify a user that communication to report an emergency is being executed, the controller 112 outputs a control signal to the voice generation circuit 118. The voice generation circuit 118 produces the audio signal representative of the guidance voice message in response to the control signal. The voice generation circuit 118 outputs the produced audio signal to an amplifier 174 within the informing device 107B. The device 174 amplifies the audio signal, and outputs the amplification-resultant audio signal to a loudspeaker 173. The loudspeaker 173 converts the output signal of the amplifier 174 into a corresponding sound which means the guidance voice message.

Twelfth Embodiment

Figure 14:
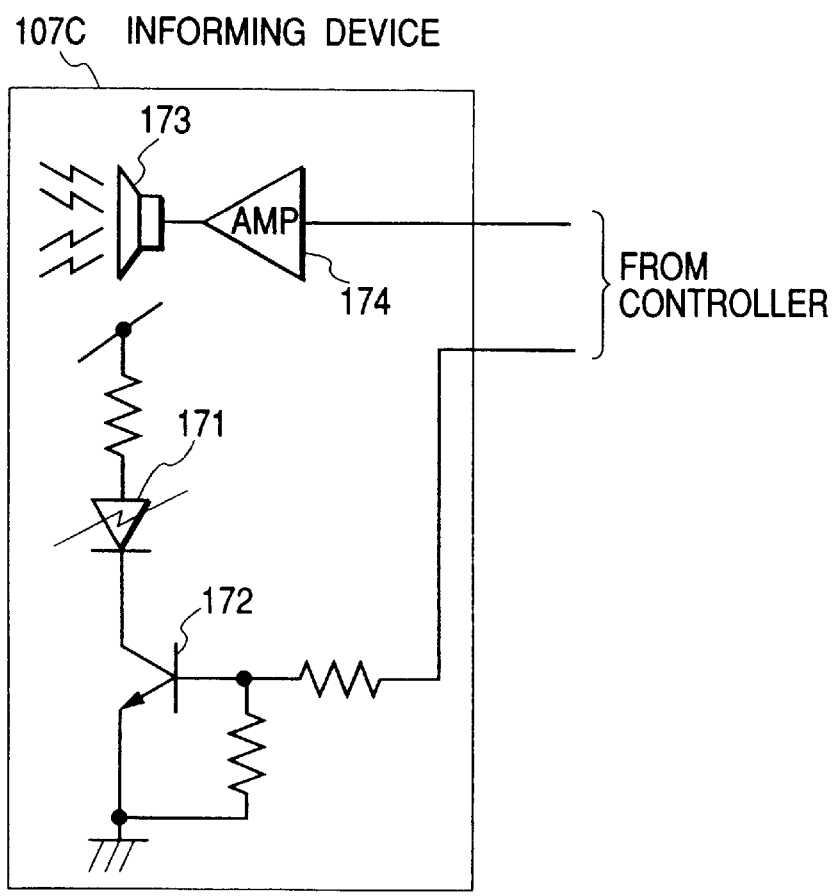
FIG. 14 is a diagram of a portion of an emergency reporting apparatus according to a twelfth embodiment of this invention.

FIG. 14 shows a portion of an emergency reporting apparatus (a terminal apparatus) according to a twelfth embodiment of this invention. The emergency reporting apparatus in FIG. 14 is similar to that in FIG. 9 except that an informing device 107C replaces the informing device 107 (see FIG. 9).

As shown in FIG. 14, the informing device 107C includes a light emitting diode (LED) 171 and a switching transistor 172. The light emitting diode 171 forms a visual indicator. The light emitting diode 171 and the switching transistor 172 are connected in series. The series combination of the light emitting diode 171 and the switching transistor 172 is connected across a DC power source (not shown). The base of the switching transistor 172 is connected to a controller 112. The switching transistor 172 is controlled by the controller 112, being changed between an on state and an off state. When the switching transistor 172 is in its on state, the light emitting diode 171 is activated. When the switching transistor 172 is in its off state, the light emitting diode 171 is deactivated.

The informing device 107C further includes a loudspeaker 173 and an amplifier 174. The loudspeaker 173 is connected to the output terminal of the amplifier 174. The input terminal of the amplifier 174 is connected to the controller 112.

When the informing device 107A is required to notify a user that communication to report an emergency is being executed, the controller 112 controls the switching transistor 172 to activate the light emitting diode 171. In this case, the controller 112 may control the switching transistor 172 to periodically activate and deactivate the light emitting diode 171. Alternatively, the controller 112 may control the switching transistor 172 to change a pattern of periodical activation and deactivation of the light emitting diode 171.

When the informing device 107A is required to notify a user that communication to report an emergency is being executed, the controller 112 outputs a control signal to the amplifier 174. The control signal represents a beep. The device 174 amplifies the control signal, and outputs the amplification-resultant control signal to the loudspeaker 173. The loudspeaker 173 converts the output signal of the amplifier 174 into a corresponding sound, that is, a beep. In this case, the control signal outputted from the controller 112 to the amplifier 174 may be designed to change a pattern of a beep produced by the loudspeaker 173.

For example, the light emitting diode 171 is placed in or on a trigger button 103 (see FIG. 9). The light emitting diode 171 may be placed in or on a vehicle instrument panel.

It should be noted that the loudspeaker 173 may be replaced by a buzzer.

Thirteenth Embodiment

Figure 15:
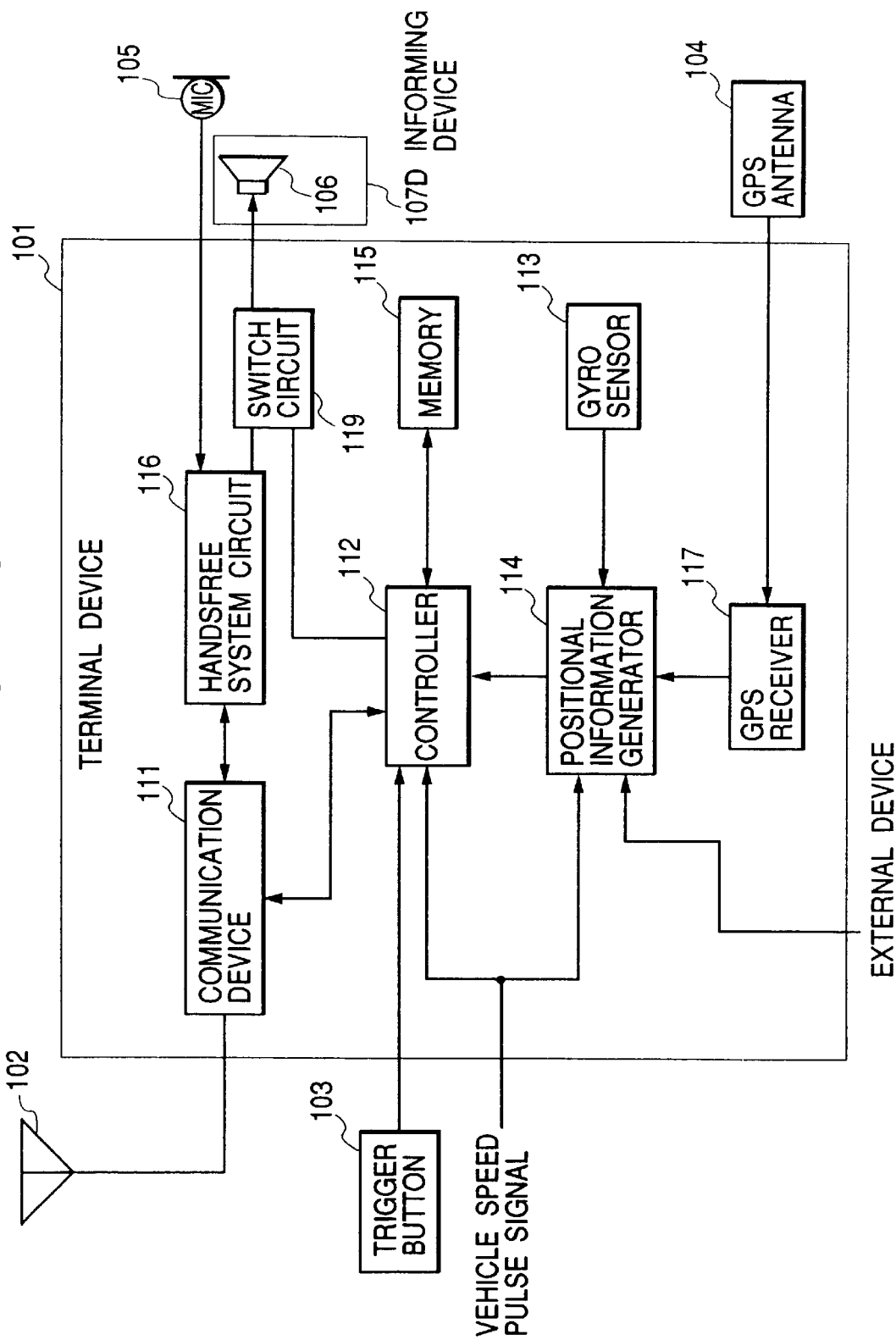
FIG. 15 is a block diagram of an emergency reporting apparatus according to a thirteenth embodiment of this invention.

FIG. 15 shows an emergency reporting apparatus (a terminal apparatus) according to a thirteenth embodiment of this invention. The emergency reporting apparatus in FIG.

15 is similar to that in FIG. 9 except for design changes mentioned hereinafter.

The emergency reporting apparatus in FIG. 15 includes an informing device 107D instead of the informing device 107 (see FIG. 9). A switch circuit 119 is connected among the informing device 107D, a controller 112, and a handsfree system circuit 116. The informing device 107D includes a loudspeaker 106. The switch circuit 119 is controlled by the controller 112, selectively connecting the informing device 107D with either the controller 112 or the handsfree system circuit 116.

When the informing device 107D is required to notify a user that communication to report an emergency is being executed, the controller 112 outputs a first control signal to the switch circuit 119. The switch circuit 119 connects the informing device 107D with the controller 112 in response to the first control signal. Then, the controller 112 feeds an audio signal representative of a beep to the informing device 107D via the switch circuit 119. The loudspeaker 106 within the informing device 107D converts the audio signal into a corresponding sound, that is, a beep.

When handsfree speech communication is required, the controller 112 outputs a second control signal to the switch circuit 119. The switch circuit 119 connects the informing device 107D with the handsfree system circuit 116 in response to the second control signal.

Fourteenth Embodiment

Figure 16:
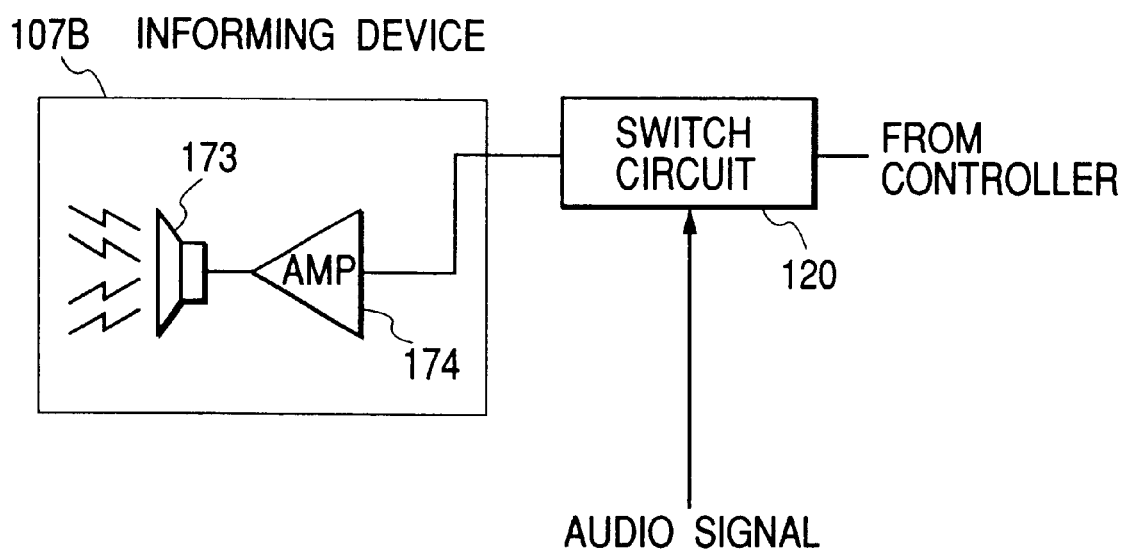
FIG. 16 is a diagram of a portion of an emergency reporting apparatus according to a fourteenth embodiment of this invention.

FIG. 16 shows a portion of an emergency reporting apparatus (a terminal apparatus) according to a fourteenth embodiment of this invention. The emergency reporting apparatus in FIG. 16 is similar to that in FIG. 12 except that a switch circuit 120 is connected among an informing device 107B, a controller 112 (see FIG. 9), and an audio apparatus (not shown). The switch circuit 120 is controlled by the controller 112, selectively connecting the informing device 107B with either the controller 112 or the audio apparatus.

When the informing device 107B is required to notify a user that communication to report an emergency is being executed, the controller 112 outputs a first control signal to the switch circuit 120. The switch circuit 120 connects the informing device 107B with the controller 112 in response to the first control signal. Then, the controller 112 feeds a first audio signal representative of a beep to the informing device 107B via the switch circuit 120. In the informing device 107B, the first audio signal is transmitted to a loudspeaker 173 via an amplifier 174. The loudspeaker 173 converts the first audio signal into a corresponding sound, that is, a beep.

When the informing device 107B is required to be used by the audio apparatus, the controller 112 outputs a second control signal to the switch circuit 120. The switch circuit 120 connects the informing device 107B with the audio apparatus in response to the second control signal. In this case, a second audio signal generated in the audio apparatus is transmitted to the informing device 107B via the switch circuit 120. The loudspeaker 173 within the informing device 107B converts the second audio signal into a corresponding sound.

Fifteenth Embodiment

A fifteenth embodiment of this invention is similar to one of the eighth to fourteenth embodiments thereof except for design changes mentioned later. In the fifteenth embodiment of this invention, the activation of an informing device (107, 107A, 107B, 107C, or 107D) causes the generation of light, a beep, or a guidance voice message.

A timing of the activation of the informing device (107, 107A, 107B, 107C, or 107D) is set to one of the following timings 1)–10):

1) a timing substantially same as the moment of the depression of a trigger button 103;
2) a timing at a start of an emergency reporting process after the moment of the depression of the trigger button 103;
3) a timing at the transmission of a dial signal toward an emergency report receiving center after the moment of the depression of the trigger button 103;
4) a timing at the establishment of connection with the emergency report receiving center after the moment of the depression of the trigger button 103;
5) a timing at the transmission of positional information toward the emergency report receiving center after the moment of the depression of the trigger button 103;
6) a timing within the interval from the moment of the depression of the trigger button 103 to the moment of the execution of speech communication with the emergency report receiving center;
7) a timing within the interval from the moment of the start of the emergency reporting process to the moment of the execution of speech communication with the emergency report receiving center;
8) a timing within the interval from the moment of the transmission of the dial signal toward the emergency report receiving center to the moment of the execution of speech communication with the emergency report receiving center;
9) a timing within the interval from the moment of the establishment of connection with the emergency report receiving center to the moment of the execution of speech communication with the emergency report receiving center; and
10) a timing within the interval from the moment of the start of the transmission of the positional information toward the emergency report receiving center to the moment of the execution of speech communication with the emergency report receiving center.

The timing of the activation of the informing device may be set to satisfy one of the following conditions 11)–15).

11) During the interval from the moment of the depression of the trigger button 103 to the moment of the end of speech communication, or during the interval from the moment of the start of the emergency reporting process to the moment of the end of speech communication, the informing device generates light to notify a user of desired information. During the interval from the moment of the depression of the trigger button 103 to the moment of the execution of speech communication, the information device generates a beep or a guidance voice message to notify the user of desired information.

12) During the interval from the moment of the depression of the trigger button 103 to the moment of the end of speech communication, or during the interval from the moment of the start of the emergency reporting process to the moment of the end of speech communication, the informing device generates light to notify the user of desired information. During the interval from the moment of the start of the emergency reporting process to the moment of the execution of speech communication, the information device generates a beep or a guidance voice message to notify the user of desired information.

13) During the interval from the moment of the depression of the trigger button 103 to the moment of the end of speech communication, or during the interval from the moment of the start of the emergency reporting process to the moment of the end of speech communication, the informing device generates light to notify the user of desired information. During the interval from the moment of the transmission of the dial signal toward the emergency report receiving center to the moment of the execution of speech communication, the information device generates a beep or a guidance voice message to notify the user of desired information.

14) During the interval from the moment of the depression of the trigger button 103 to the moment of the end of speech communication, or during the interval from the moment of the start of the emergency reporting process to the moment of the end of speech communication, the informing device generates light to notify the user of desired information. During the interval from the moment of the establishment of connection with the emergency report receiving center to the moment of the execution of speech communication, the information device generates a beep or a guidance voice message to notify the user of desired information.

15) During the interval from the moment of the depression of the trigger button 103 to the moment of the end of speech communication, or during the interval from the moment of the start of the emergency reporting process to the moment of the end of speech communication, the informing device generates light to notify the user of desired information. During the interval from the moment of the start of the transmission of positional information toward the emergency report receiving center to the moment of the execution of speech communication, the information device generates a beep or a guidance voice message to notify the user of desired information.

The informing device and a controller 112 may be modified to execute one of the following processes 16) and 17).

16) A first stage is defined as extending from the moment of the depression of the trigger button 103 to the moment of the start of the emergency reporting process. A second stage is defined as extending from the moment of the start of the emergency reporting process to the moment of the transmission of the dial signal. A third stage is defined as extending from the moment of the transmission of the dial signal to the moment of the establishment of connection with the emergency report receiving center. A fourth stage is defined between the moment of the establishment of connection with the emergency report receiving center to the moment of the end of the transmission of the positional information. A fifth stage is defined as extending from the moment of the end of a data communication process to the moment of change to the speech communication. At timings in the first, second, third, fourth, and fifth stages respectively, a pattern of the generation of light by the information device or an on/off pattern thereof is varied to inform the user of a change from the present stage to a next stage. Alternatively, a pattern of the generation of a beep or a guidance voice message by the informing device may be varied.

17) A first stage is defined as extending from the moment of the depression of the trigger button 103 to the moment of the establishment of connection with the emergency report receiving center. A second stage is defined as extending from the moment of the establishment of connection with the emergency report receiving center to the moment of change to speed communication. When the first stage is replaced by the second stage, a pattern of the generation of light by the information device or an on/off pattern thereof is varied to inform the user that data communication to transmit the positional information has been successfully completed. Alternatively, a pattern of the generation of a beep or a guidance voice message by the informing device may be varied.

What is claimed is:

1. An emergency reporting apparatus for a vehicle, comprising:
    a communication device;
    first means for, in cases where an emergency occurs in the vehicle, using the communication device to report the emergency to an emergency report receiving center; and
    second means for informing on a passive basis a user on an automatically generated audio basis of an operating condition of the communication device when the communication device is used by the first means.

2. An emergency reporting apparatus as recited in claim 1, wherein the communication device includes a radio communication device.

3. An emergency reporting apparatus as recited in claim 1, wherein the operating condition of the communication device includes at least one of a standby state, a calling state, a data communication state, a communication ending state, a retry calling state, a normal communication state, an abnormal communication state, and an out-of-service-area communication-impossible state.

4. An emergency reporting apparatus as recited in claim 1, wherein the second means comprises at least one of 1) means for generating a sound or 2) means for generating a voice.

5. An emergency reporting apparatus for a vehicle, comprising:
    a trigger button operable by a user in cases where the vehicle causes an accident;
    first means for detecting a collision of the vehicle against another object;
    second means for detecting that the vehicle causes an accident in response to at least one of operation of the trigger button and operation of the first means;
    third means for updatably detecting a position of the vehicle;
    a memory;
    fourth means for storing information of the vehicle position detected by the third means into the memory;
    a communication device;
    fifth means for, when the second means detects that the vehicle causes an accident, using the communication device to call an emergency report receiving center and establish connection with the emergency report receiving center;
    sixth means for, when the connection with the emergency report receiving center has been established by the fifth means, transmitting the information of the vehicle position from the memory to the emergency report receiving center via the communication device;
    an informing device; and
    seventh means for, when the connection with the emergency report receiving center has been established by the fifth means, using the informing device on a passive basis to notify the user on an automatically generated audio basis of an operating condition of the communication device.

6. An emergency reporting apparatus for a vehicle, comprising:

a trigger button operable by a user in cases where an emergency occurs;

first means for reporting an emergency to an emergency report receiving center in response to operation of the trigger button; and second means for informing on a passive basis a user on an automatically generated audio basis that the first means is reporting an emergency.

7. An emergency reporting apparatus as recited in claim 6, wherein the second means comprises means for generating a beep.

8. An emergency reporting apparatus as recited in claim 6, wherein the second means comprises means for generating a synthesized voice.

9. An emergency reporting apparatus as recited in claim 6, further comprising a loudspeaker provided in the second means, and third means for using the loudspeaker to execute speech communication while the first means is reporting an emergency.

10. An emergency reporting apparatus as recited in claim 6, further comprising a loudspeaker in an audio apparatus, the second means including the loudspeaker.

11. An emergency reporting network system comprising:

emergency report receiving center;

a communication network; and emergency reporting apparatuses connectable with the emergency report receiving center via the communication network;

wherein each of the emergency reporting apparatuses comprises the emergency reporting apparatus of claim 6.

* * * * *